United States Patent
More et al.

(10) Patent No.: US 11,516,172 B2
(45) Date of Patent: Nov. 29, 2022

(54) SYSTEMS AND METHODS FOR EMAIL BASED DATA INGESTION AND INTELLIGENT WORKFLOWS

(71) Applicant: Cigna Intellectual Property, Inc., Wilmington, DE (US)

(72) Inventors: Viraj More, Cary, NC (US); Vinod Abbugar, Manchester, CT (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 17/503,551

(22) Filed: Oct. 18, 2021

(65) Prior Publication Data

US 2022/0182350 A1 Jun. 9, 2022

Related U.S. Application Data

(63) Continuation of application No. 17/115,992, filed on Dec. 9, 2020, now Pat. No. 11,153,251.

(51) Int. Cl.
| | | |
|---|---|---|
| *H04L 51/48* | (2022.01) | |
| *G06F 40/205* | (2020.01) | |
| *H04L 51/08* | (2022.01) | |
| *H04L 51/212* | (2022.01) | |

(52) U.S. Cl.
CPC ............ *H04L 51/48* (2022.05); *G06F 40/205* (2020.01); *H04L 51/08* (2013.01); *H04L 51/212* (2022.05)

(58) Field of Classification Search
CPC ....... H04L 51/48; H04L 51/08; H04L 51/212; H04L 51/42; G06F 40/205
See application file for complete search history.

(56) References Cited

U.S. PATENT DOCUMENTS

| | | |
|---|---|---|
| 9,354,904 B2 | 5/2016 | Sanghvi |
| 9,852,127 B2 | 12/2017 | Dettinger |
| 9,948,585 B2 | 4/2018 | Levasseur |
| 10,839,404 B2 | 11/2020 | Ramamurthy |
| 2003/0171961 A1 | 9/2003 | Hosali |
| 2006/0212286 A1* | 9/2006 | Pearson ............... G06Q 10/107 704/9 |
| 2007/0038702 A1* | 2/2007 | Taylor ................. G06Q 10/107 709/206 |
| 2013/0054613 A1 | 2/2013 | Bishop |
| 2016/0048780 A1 | 2/2016 | Sethumadhavan |
| 2016/0162819 A1 | 6/2016 | Hakman |

(Continued)

*Primary Examiner* — Austin J Moreau
(74) *Attorney, Agent, or Firm* — Jordan IP Law PC

(57) ABSTRACT

An ingestion server is provided for processing emails and providing intelligent workflows. The ingestion server includes a processor and a memory. The processor is configured to receive an electronic mail message containing a set of email content and to determine a content type. The content type is one of structured content and unstructured content. The processor is configured to identify a parsing module from a plurality of parsing modules to process the set of email content. The processor is configured to apply the identified parsing module to the set of email content to obtain a set of parsed email content. The processor is configured to apply a mapper module to the set of parsed email content to obtain a routing path. The processor is also configured to define an intelligent workflow based on the routing path. The processor is also configured to submit the work item using the intelligent workflow.

20 Claims, 5 Drawing Sheets

(56) References Cited

U.S. PATENT DOCUMENTS

| | | |
|---|---|---|
| 2016/0381049 A1 | 12/2016 | Lakhani |
| 2017/0069043 A1 | 3/2017 | Doyle |
| 2017/0352041 A1* | 12/2017 | Ramamurthy ......... G06N 5/043 |
| 2019/0066013 A1 | 2/2019 | Gupta |
| 2019/0364081 A1 | 11/2019 | Valenzuela |

* cited by examiner

SYSTEMS AND METHODS FOR EMAIL BASED DATA INGESTION AND INTELLIGENT WORKFLOWS

CROSS REFERENCE TO RELATED APPLICATIONS

This application is a continuation of U.S. application Ser. No. 17/115,992, which was filed Dec. 9, 2020. The entire disclosure of said application is incorporated herein by reference.

FIELD

The field generally relates to systems for processing and ingesting electronic mail and intelligent gateways for processing structured and unstructured electronic mail to create automated intelligent workflows.

BACKGROUND

In modern computing, electronic mail ("email") may be used for purposes other than user-to-user communication and, instead, to provide communications infrastructure in more complex systems. In some examples, email may be used as a tool to trigger or effect a process or a series of events. For example, a service may receive an email and, based on that email, perform additional steps. Such email driven applications are gaining in popularity in a variety of enterprise systems.

One of the advantages of email is that it is relatively widely available and allows significant flexibility in content. However, that flexibility of email is also associated with complexity from varying formats including both structured and unstructured formats. As a result, a known technical challenge for email-based systems is providing consistent interpretation and processing of emails with such a varying structured and unstructured formats. In many cases, such systems face challenges or inability to process, understand, ingest, and utilize email content in a consistent and reliable manner. As a result, the ability to use email in such email-based systems may be limited and emails used in such systems may fail to be reliably routed or understood. The wide range of email formats therefore presents a technical challenge for any system that may utilize email as an initiation path.

In some known examples, email is used as a mechanism to initiate transactions and drive other processes. As a part of this approach, email information or content is received and extracted (or "ingested"). However, because of the problems identified above, many such systems face difficulties in such ingestion or extraction. Further, transaction steps based on email content (e.g., routing of workflows) often fail because of such problems in ingestion or extraction. Such failures frequently render these email-based systems inefficient or cause greater technical difficulties including operational failure.

As such, systems and methods for improved ingestion, processing, and utilization of email data in structured and unstructured formats for use in email-based systems is desirable.

BRIEF SUMMARY

In one aspect, an ingestion server is provided for processing emails and providing intelligent workflows. The ingestion server includes a processor and a memory. The processor is configured to receive an electronic mail message containing a set of email content. The processor is also configured to determine a content type associated with the set of email content. The content type is one of structured content and unstructured content. The processor is additionally configured to identify a parsing module from a plurality of parsing modules to process the set of email content. The parsing module is identified based on the content type. The processor is also configured to apply the identified parsing module to the set of email content to obtain a set of parsed email content. The processor is further configured to apply a mapper module to the set of parsed email content to obtain a routing path. The processor is also configured to define an intelligent workflow based on the routing path. The processor is additionally configured to populate a work item using the set of parsed email content. The processor is also configured to submit the work item using the intelligent workflow.

In another aspect, an ingestion system is provided for processing emails and providing intelligent workflows. The ingestion system includes an email server further including an email processor and an email memory. The ingestion system also includes a workflow server further including a workflow processor and a workflow memory. The ingestion system also includes an ingestion server including a processor and a memory. The ingestion server is in communication with the email server and the workflow server. The processor is configured to receive an electronic mail message containing a set of email content from the email server. The processor is also configured to determine a content type associated with the set of email content. The content type is one of structured content and unstructured content. The processor is additionally configured to identify a parsing module from a plurality of parsing modules to process the set of email content. The parsing module is identified based on the content type. The processor is also configured to apply the identified parsing module to the set of email content to obtain a set of parsed email content. The processor is further configured to apply a mapper module to the set of parsed email content to obtain a routing path. The processor is also configured to define an intelligent workflow based on the routing path. The processor is additionally configured to populate a work item using the set of parsed email content. The processor is also configured to submit the work item using the intelligent workflow to the workflow server.

In yet another aspect, a method is provided for processing emails and providing intelligent workflows. The method is performed by an ingestion server. The ingestion server includes a processor and a memory. The method includes receiving an electronic mail message containing a set of email content. The method also includes determining a content type associated with the set of email content. The content type is one of structured content and unstructured content. The method additionally includes identifying a parsing module from a plurality of parsing modules to process the set of email content. The parsing module is identified based on the content type. The method further includes applying the identified parsing module to the set of email content to obtain a set of parsed email content. The method also includes applying a mapper module to the set of parsed email content to obtain a routing path. The method further includes defining an intelligent workflow based on the routing path. The method also includes populating a work item using the set of parsed email content. The method further includes submitting the work item using the intelligent workflow.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

In the drawings, reference numbers may be reused to identify similar and/or identical elements.

DETAILED DESCRIPTION

Figure 1:
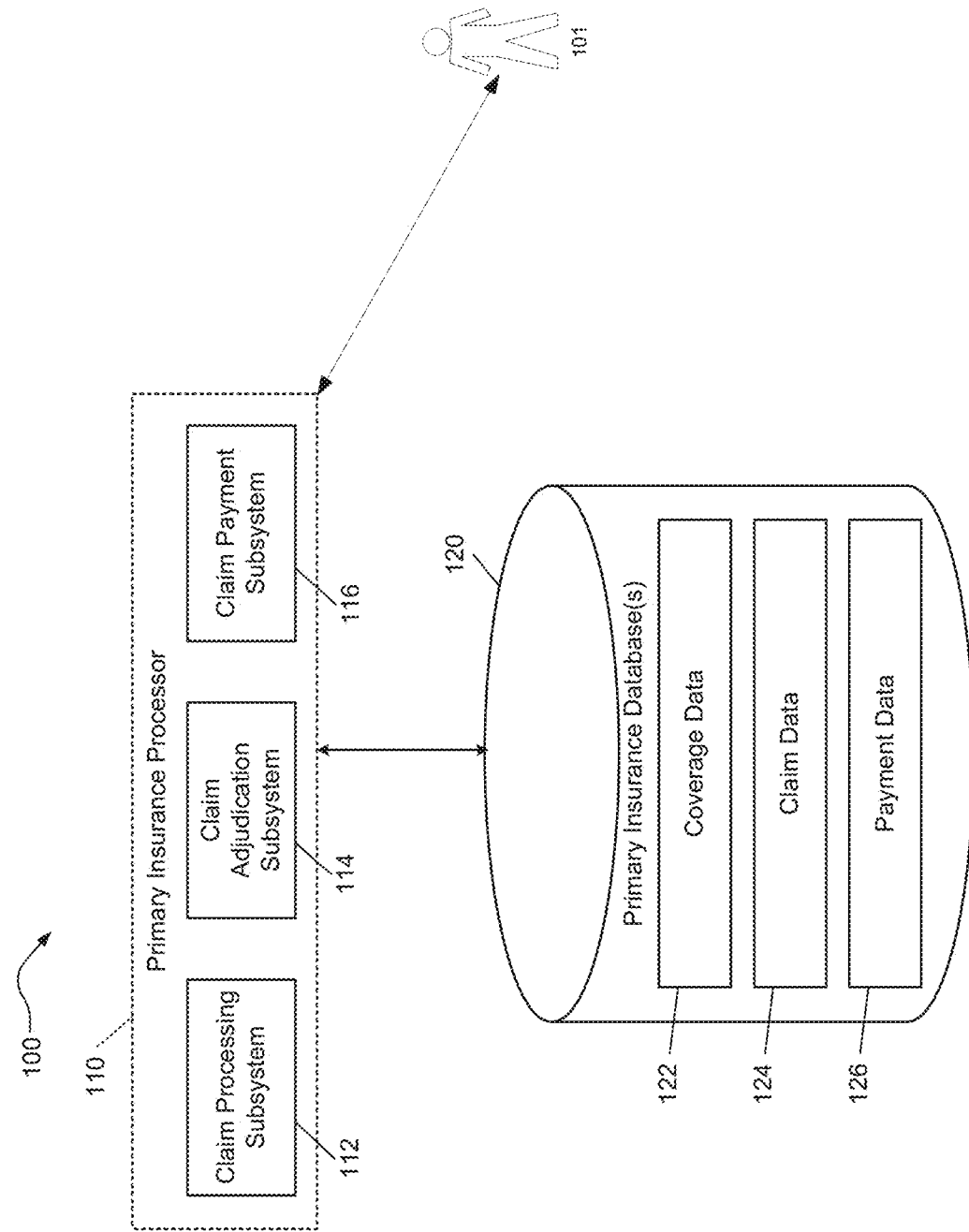
FIG. 1 is a functional block diagram of an example insurance claim processing system.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

The systems and methods described herein address known problems in email-based systems and other messaging-based systems, and specifically the problems created by varying structured and unstructured formats of messages and challenges in processing such messages.

Many known workflow systems heavily utilize email to drive transactions and therefore are especially exposed to these issues. In many examples, as a result, emails sent to previous ingestion systems were lost or resulted in misrouting or misprocessing. Previous systems lacked any robust capability to reliably process and understand email with varying formats. Previous systems also lacked the ability to set work item attributes. These problems led to significant inefficiency and error. Therefore, a technological problem existed in prior solutions and a need to understand email along with a need to reliably process email sources, email subjects, and email content. and use resulting data in routing.

The described systems and methods address these challenges by providing a technological solution necessarily rooted in computer networking. Specifically, the systems and methods include an ingestion system and an ingestion server for processing emails and providing intelligent workflows.

The disclosed ingestion systems are configured to provide a robust solution that ingests, processes, and utilizes emails of varying structured and unstructured formats without error. As a result, these ingestion systems provide enhanced accuracy of ingestion, routes workflows accurately, and maintains service level agreements ("SLAs") with regard to message routing. The ingestion systems also allow administrative users to configure email types dynamically without changing code or requiring release time pendency from information technology teams. The ingestion systems thereby reduce or eliminate deployment times and avoid pendency or error resolution in dealing with unstructured emails. In some examples, the ingestion systems allow structured email types to be configured and implemented without delay. Thus, the described ingestion systems increase overall efficiency and data accuracy.

The disclosed ingestion systems provide tools to configure unstructured email types. Such configuration tools allow for setting email source and subject and resulting routing. Such systems have resulted in enhanced email message processing volume and accuracy.

The ingestion server provides ingestion services that may also be referred to as a Central Intake Service for processing structured and unstructured messages, and more specifically for processing structured and unstructured emails. The ingestion server includes several modules configured to provide the methods described herein. The modules include: (1) a central process module (also referred to as an email adapter module) configured to receive inbound messages from another system (e.g., an email server) and submit the messages to downstream modules; (2) parsing modules configured to perform functions including parsing email content and assign the content to business object(s); (3) a file extraction module (also referred to as a filenet module) for extracting attached files from the email and extracting content from such attached files; (4) a mapper module for mapping assigned business objects to other business objects; and (5) a routing module for routing using a workflow server. Such modules are described in more detail below.

The central process module is configured to receive email messages that are sent from another system, including through the use of an email server. The received email messages may be in any suitable file format. The central process module is also configured to initiate the calling of downstream modules. In some examples, the central process module is also configured to coordinate the ingestion process in its entirety by invoking each module or sub-module.

The parsing modules are configured to parse email content and to assign the parsed content to a business object(s). The logic applied by the parsing modules is complex and described in detail below. In some examples, the parsing modules utilize text processing algorithms to determine the content of the email.

The parsing modules are distinct for structured emails and unstructured emails in some examples. In other examples, a singular parsing module is used with sub-modules for parsing structured and unstructured emails. The parsing module performs steps to determine whether each email is structured or unstructured. As used herein, a "structured email" is an email with fixed structures (or labels) that identify associated email content appearing after (or immediately proximate to) the fixed structure(s). As used herein, an "unstructured" email is an email without such fixed structured (or labels) that identify associated email content. Email types are determined in the following manner. When an email is received by the ingestion server (e.g., at the central process module), an email type identification module applies a method to identify the email type. In one example, the email type identification module compares the subject line and the from address of the email to an email content table defining potential email types based on, for example, email attributes including email from address and email subject line. The email content table includes a plurality of rows (or entries) with unique values for from addresses and subject lines and associated email types. Therefore, the email type identification module identifies a match between the email and a row (or entry) with matching subject lines and from addresses. If a match is determined, the email type is identified based on the entry with a matching subject line and from address. In another example, if no match is found in the prior step, the email type identification module compares the subject line of the email to the email content table to identify an entry with a matching subject line. If a match is determined, the email type is identified based on that matching entry. In another example, if no match is found in the prior steps, the email type identification module compares the from address of the email to the email content table to identify an entry with a matching from address. If a match is determined, the email type is identified based on that matching entry. In another example, if no match is determined in the prior steps, the email ingestion system determines that the email type is unstructured. As described below, emails with unstructured types are processed with a distinct method and modules based on a business exception path. In some examples, the email type identification module performs a keyword search based on a list of keywords associated with a specified structure in a keyword lookup table. If the keyword is found in the email, the email type identification module determines that the email type is that which corresponds to the matching keyword. In some examples, email types may be defined for complex subject lines containing multiple attributes used for matching to email type.

Structured emails, as described herein, have each fixed structure (or label) and associated content on distinct lines of the email with a delimiter after each fixed structure. In one example, the delimiter is a colon but the delimiter may be any suitable alphanumeric character. Each fixed structure (or label) is unique in structured emails to avoid duplication of email content or misinterpretation based thereon. In most examples, the fixed structure value or label value (i.e., the content associated with the corresponding fixed structure or label) is immediately after or otherwise proximate to the corresponding fixed structure or label, and on the same line of the email. In the example embodiment, three distinct parsing modules (or parsing submodules) may be used for parsing the structured email.

In a first example, a first parsing submodule for structured email receives an email with fixed structures and corresponding fixed structure values and applies a text processing algorithm to identify each fixed structure by retrieving each new string on each new line of the email until a delimiter is identified. The text processing algorithm also identifies each subsequent fixed structure value by retrieving each subsequent string until an endline or the end of the email is detected. The retrieved fixed structures and fixed structure values are converted into name-value pairs which represent output from this first parsing submodule for structured email. In some examples, the parsing submodule may also write the fixed structures and fixed structure labels to a hash map.

In a second example, a second parsing submodule for structured email receives a list of fixed structures (or labels), an email, and an email type. The list of fixed structures may be obtained by invoking an email label definition submodule or by any other suitable means. As described above, the email type may be determined by scanning email attributes (e.g., email from address and subject line) and comparing the scanned email attributes to an email content table defining potential email types based on, for example, email attributes including email from address and email subject line. This second parsing submodule extracts each fixed structure (or label) identified based on the list of fixed structures along with the corresponding fixed structure values and returns the listed fixed structures and associated fixed structure values as name-value pairs. In some examples, the parsing submodule may also write the fixed structures and fixed structure labels to a hash map. Unlike the first parsing submodule, the second parsing submodule does not identify any new fixed structure or fixed structure value based on the presence of a new line and delimiters, but instead scans for only fixed structures that are identified in the list of fixed structures.

In a third example, a third parsing submodule for structured email receives a list of fixed structures from the email label definition submodule, a list of fixed structures from a database table containing the list of fixed structures, an email, and a hash map. The hash map may be obtained from invoking the second parsing submodule. The third parsing submodule identifies fixed structures and fixed structure values that are provided in both the email label definition submodule and the database table.

In many examples, the parsing submodules determine a routing path (or a routing workstream) associated with the email. The routing path may be determined based on the email content table. In at least one example, the email content table includes columns for the following data for each entry: (a) email type; (b) type (i.e., whether structured or unstructured); (c) subject line (i.e., subject lines associated with the email type); (d) from line (i.e., a from line associated with the email type); (e) whether a workitem should be created for the email (i.e., a Boolean value indicating whether to create a workitem); (f) a routing workstream indicating where to route the message; (g) a workstream step indicating what steps should be taken next including (i) intake; (ii) load; and (iii) review; and (h) a routing team indicating receiving groups.

The file extraction module or (filenet module) is configured to identify, extract, and process content from attached files for use in ingestion and workflows. In some examples, a subject may indicate that an attachment is included for processing with a suitable attachment identifier. In other examples, the file extraction module detects the presence of an attachment. The file extraction module extracts the attached file and identifies relevant information based on, for example, the email content table or a file processing table, and searches for responsive information in the attached file. In one example, the file extraction module extracts data from attached spreadsheet files (e.g., .csv or .xcl files) and extracts specific column entries from the spreadsheet and, depending upon the column values and the rule sets defined by the email content table or file processing table perform steps including: (i) create a work item based on the extracted data; (ii) load the extracted data into a corresponding database; and (iii) transmit a message based on the extracted data. In some examples, the file extraction module performs a lookup of the corresponding database to determine whether a work item has been created corresponding to the extracted data and subsequently creates work items for entries without preexisting work items and updates the corresponding entries accordingly. In further examples, the file extraction module determines whether work item creation was successful, not started, or resulted in error, and updates the corresponding database to reflect the work item status.

In some examples, the central intake module applies an intake submodule to identify new fixed structures in structured emails. Specifically, the central intake module parses fixed structures (based on the above methods) and identifies fixed structures that are not otherwise identified by the email label definition submodule or the database table containing the list of fixed structures. The central intake module attempts to match each parsed fixed structure against those previously identified fixed structures and any non-matching fixed structures are identified as new. In some examples, the central intake module updates the email label definition submodule or the database module with such new fixed structures. In others, the central intake module prompts a user to confirm that the email label definition submodule or the database module should be updated with such new fixed structures. In other examples, the central intake module applies a default unstructured table to define default values for routing and processing an unstructured email, upon definition, including values for: (a) email type; (b) type (i.e., whether structured or unstructured); (c) subject line (i.e., subject lines associated with the email type); (d) from line (i.e., a from line associated with the email type); (e) whether a workitem should be created for the email (i.e., a Boolean value indicating whether to create a workitem); (f) a routing workstream indicating where to route the message; (g) a workstream step indicating what steps should be taken next including (i) intake; (ii) load; and (iii) review; and (h) a routing team indicating receiving groups. These default values are used to define the processing of each unstructured email. In many examples, the values for subject line and from line for such default values are left blank or unspecified as they are not used.

In some examples, the central intake module is configured to log each of the steps performed by the modules and submodules, including writing records for each received email, each processing determination, each work item creation, and each routing activity. In other examples, the central intake module generates a resultant email content file reflecting the email content in any suitable file format including text files or HTML files.

The central intake module and associated modules and submodules are associated with user interfaces configured to control and define the tables and rules described herein. The user interfaces also provide visualization and validation of rules for setting email types. For example, a user may provide a new email type including a new email subject line and email from line (or email source). The user interface is configured to verify that each new email type, new email subject line, and new from line are all unique to avoid errors in processing. The user interface also allows users to set default values for email types for, for example, use in processing unstructured emails pursuant to business exception paths. Routing module is configured to handle the processing of work items and communications based on the specified route path.

The modules described herein utilize text processing using algorithms including regular expressions and pattern matching or any suitable alternative.

The mapper module is configured to identify mapped business objects, routing workstreams, steps, and routing teams, and to route accordingly. Specifically, the mapper module utilizes the email content table values for the email type, including default values, and routes accordingly. In some examples, the mapper module routes a resulting work item to, for example, a workflow server or any other suitable recipient.

An ingestion server is provided for processing emails and providing intelligent workflows. In some examples, the ingestion server is part of an ingestion system including an email server that further includes an email processor and an email memory, and a workflow server that includes a workflow processor and a work flow memory. The ingestion server includes a processor and a memory. The processor is configured to receive an electronic mail message containing a set of email content.

The processor is also configured to determine a content type associated with the set of email content wherein the content type is one of structured content and unstructured content, as specified above. The processor is further configured to identify a parsing module from a plurality of parsing modules to process the set of email content, wherein the parsing module is identified based on the content type. Specifically, the parsing module selected may be one of the parsing modules or submodules specified above for structured or unstructured content.

The processor is also configured to apply the identified parsing module to the set of email content to obtain a set of parsed email content. The processor is further configured to apply a mapper module to the set of parsed email content to obtain a routing path. The routing path may be defined, as described above, in the email content table. The processor is also configured to define an intelligent workflow based on the routing path. The processor is also configured to populate a work item using the set of parsed email content. The work item may be required as specified by the associated entry of the work item table. The processor is also configured to submit the work item using the intelligent workflow.

The processor is also configured to apply a file extraction module to the set of email content to obtain a file attached to the set of email content. The processor is further configured to apply the identified parsing module to the attached file to obtain a set of parsed attached data. The processor is also configured to populate the work item using the set of parsed email content and the set of parsed attached data.

The processor is also configured to generate a work item identifier associated with the electronic mail message upon receiving the electronic mail message. The processor is additionally configured to define the work item with the work item identifier and to populate the work item using the set of parsed email content.

Upon determining the content type associated with the set of email content is structured content, the processor is configured to identify a set of fixed structures associated with the structured content. The processor is also configured to identify the parsing module configured to obtain data associated with the set of fixed structures. The processor is further configured to apply the identified parsing module to the set of email content to obtain the set of parsed email content associated with the set of fixed structures.

Upon determining the content type associated with the set of email content is unstructured content, the processor is configured to retrieve a subject and a from address from the set of email content. The processor is also configured to receive an email content table including a plurality of entries each having an associated subject and an associated from address. The processor is also configured to attempt to match at least one of the subject and the from address to the plurality of entries having an associated subject matching the subject or an associated from address matching the from address. The processor is further configured to apply the mapper module to the set of parsed email content to obtain the routing path, wherein the routing path is at least partially identified by the matching entry having an associated subject matching the subject or an associated from address matching the from address.

Upon failing to match at least one of the subject and the from address to the plurality of entries, the processor is configured to determine that the set of email content is associated with a business exception. The processor is also configured to identify a business exception path and to apply the mapper module to the set of parsed email content to obtain the routing path associated with the business exception path.

The processor is also configured to receive an update to the email content table associated with an update subject and an update from address. The processor is also configured to validate that the update subject and update from address do not exist in the email content table. The processor is further configured to update the email content table with the update.

Generally, the systems and methods described herein are configured to perform at least the following steps: receiving an electronic mail message containing a set of email content; determining a content type associated with the set of email content wherein the content type is one of structured content and unstructured content; identifying a parsing module from a plurality of parsing modules to process the set of email content, wherein the parsing module is identified based on the content type; applying the identified parsing module to the set of email content to obtain a set of parsed email content; applying a mapper module to the set of parsed email content to obtain a routing path; defining an intelligent workflow based on the routing path; populating a work item using the set of parsed email content; submitting the work item using the intelligent workflow; applying a file extraction module to the set of email content to obtain a file attached to the set of email content; applying the identified parsing module to the attached file to obtain a set of parsed attached data; populating the work item using the set of parsed email content and the set of parsed attached data; generating a work item identifier associated with the electronic mail message upon receiving the electronic mail message; defining the work item with the work item identifier; populating the work item using the set of parsed email content; upon determining the content type associated with the set of email content is structured content, identifying a set of fixed structures associated with the structured content; identifying the parsing module configured to obtain data associated with the set of fixed structures; applying the identified parsing module to the set of email content to obtain the set of parsed email content associated with the set of fixed structures; upon determining the content type associated with the set of email content is unstructured content, retrieving a subject and a from address from the set of email content; receiving an email content table including a plurality of entries each having an associated subject and an associated from address; attempting to match at least one of the subject and the from address to the plurality of entries having an associated subject matching the subject or an associated from address matching the from address; applying the mapper module to the set of parsed email content to obtain the routing path, wherein the routing path is at least partially identified by the matching entry having an associated subject matching the subject or an associated from address matching the from address; upon failing to match at least one of the subject and the from address to the plurality of entries, determining that the set of email content is associated with a business exception; identifying a business exception path; applying the mapper module to the set of parsed email content to obtain the routing path associated with the business exception path; receiving an update to the email content table associated with an update subject and an update from address; validating that the update subject and update from address do not exist in the email content table; and updating the email content table with the update.

FIG. 1 is a functional block diagram of an example insurance claim processing system 100 including a primary insurance processor system 110. Primary insurance processor system 110 includes subsystems 112, 114, and 116 capable of providing claim processing, claim adjudication, and claim payment respectively. Specifically, primary insurance processor system 110 is associated with a corresponding primary insurance database system 120. As described above and herein, database systems such as database systems 120 may include one or more than one databases that each are configured to use a DBMS. In some cases the DBMS systems may be distinct from one another. Further, each database is associated with a data schema that may be unique depending on whether the DBMS and clam category are distinct. As such, the databases include data that cannot be processed using common programs. Database systems 120 include necessary information stored on at least one of their underlying databases. Specifically, primary insurance database system 120 includes coverage data 122, claim data 124, and payment data 126.

Figure 2:
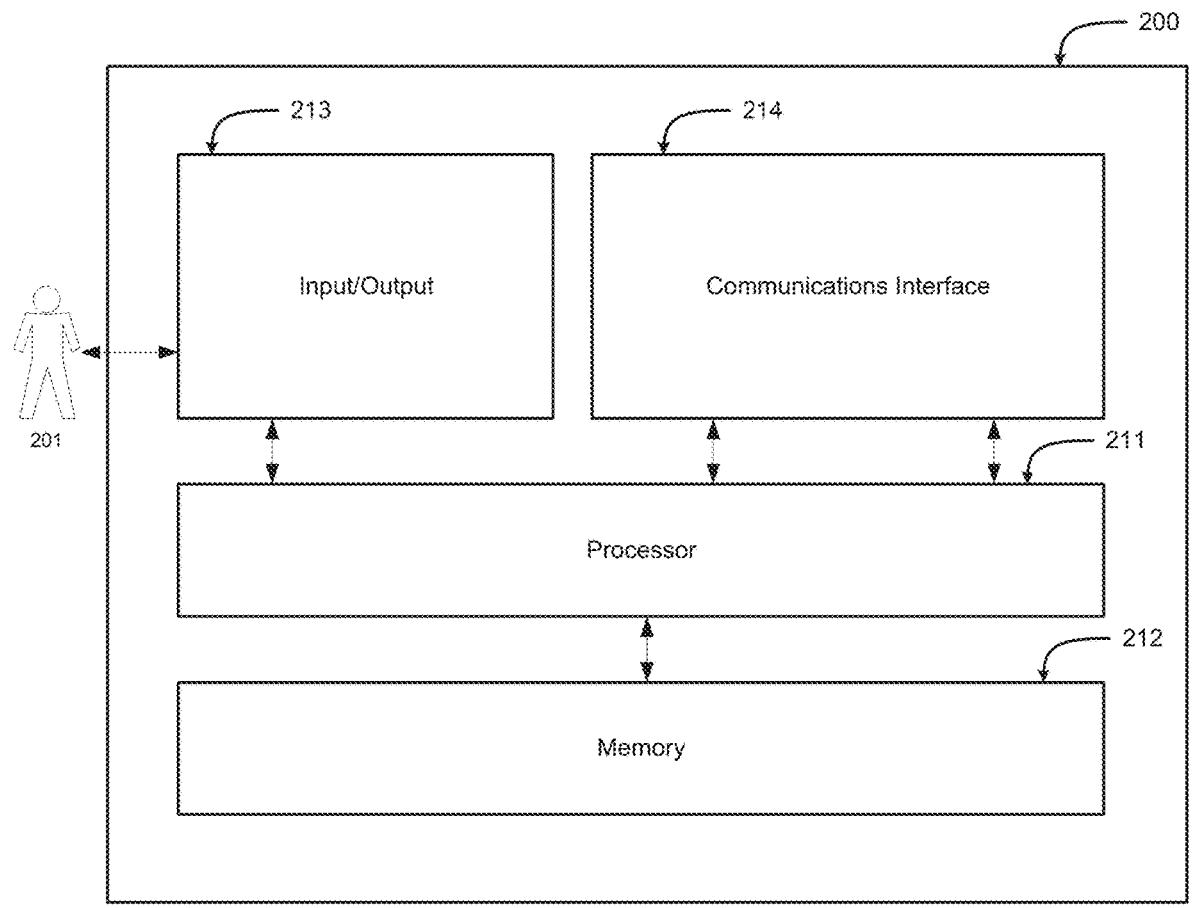
FIG. 2 is a functional block diagram of an example computing device that may be used in the ingestion system described.
Figure 3:
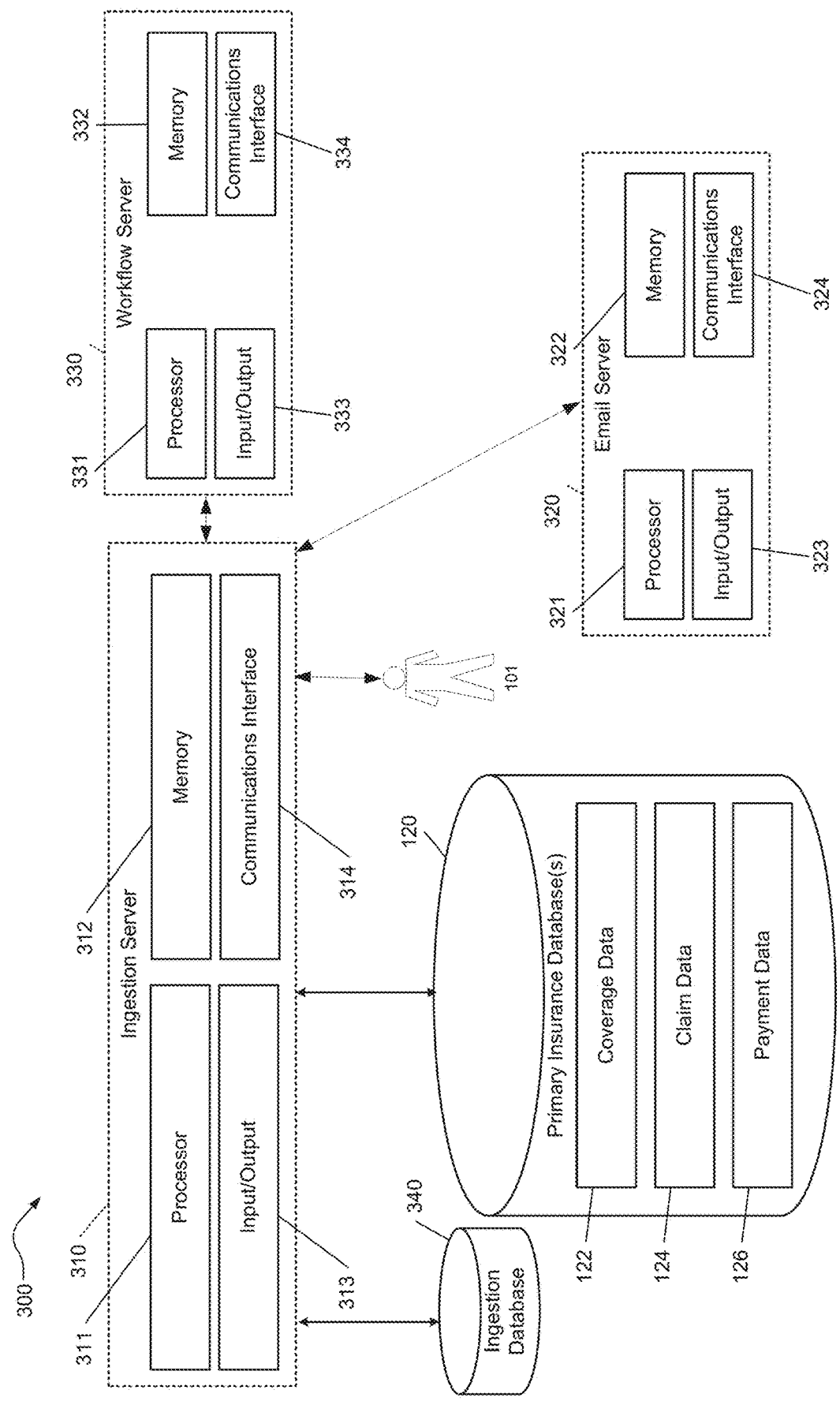
FIG. 3 is a functional block diagram of an ingestion system that may be deployed within the system of FIG. 1 using the computing devices shown in FIG. 2.

FIG. 2 is a functional block diagram of an example computing device that may be used in the ingestion system described, and may represent the ingestion server, the email server, and the workflow server (all shown in FIG. 3). Specifically, computing device 200 illustrates an example configuration of a computing device for the systems shown herein, and particularly in FIGS. 1 and 3. Computing device 200 illustrates an example configuration of a computing device operated by a user 201 in accordance with one embodiment of the present invention. Computing device 200 may include, but is not limited to, the ingestion server, the first database system, and the second database system (all shown in FIG. 3), other user systems, and other server systems. Computing device 200 may also include servers, desktops, laptops, mobile computing devices, stationary computing devices, computing peripheral devices, smart phones, wearable computing devices, medical computing devices, and vehicular computing devices. In some variations, computing device 200 may be any computing device capable of the described methods for processing emails and providing intelligent workflows including an ingestion server. In some variations, the characteristics of the described components may be more or less advanced, primitive, or non-functional.

In an example embodiment, computing device 200 includes a processor 211 for executing instructions. In some embodiments, executable instructions are stored in a memory area 212. Processor 211 may include one or more processing units, for example, a multi-core configuration. Memory area 212 is any device allowing information such as executable instructions and/or written works to be stored and retrieved. Memory area 212 may include one or more computer readable media.

Computing device 200 also includes at least one input/output component 213 for receiving information from and providing information to user 201. In some examples, input/output component 213 may be of limited functionality or non-functional as in the case of some wearable computing devices. In other examples, input/output component 213 is any component capable of conveying information to or receiving information from user 201. In some embodiments, input/output component 213 includes an output adapter such as a video adapter and/or an audio adapter. Input/output component 213 may alternatively include an output device such as a display device, a liquid crystal display (LCD), organic light emitting diode (OLED) display, or "electronic ink" display, or an audio output device, a speaker or headphones. Input/output component 213 may also include any devices, modules, or structures for receiving input from user 201. Input/output component 213 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 213. Input/output component 213 may further include multiple sub-components for carrying out input and output functions.

Computing device 200 may also include a communications interface 214, which may be communicatively coupleable to a remote device such as a remote computing device, a remote server, or any other suitable system. Communication interface 214 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 214 is configured to allow computing device 200 to interface with any other computing device or network using an appropriate wireless or wired communications protocol such as, without limitation, BLUETOOTH®, Ethernet, or IEE 802.11. Communications interface 214 allows computing device 200 to communicate with any other computing devices with which it is in communication or connection.

FIG. 3 is a functional block diagram of an ingestion system 300 that may be deployed within system 100 (shown in FIG. 1) using the computing device 200 (shown in FIG. 2). Specifically, ingestion system 300 includes ingestion server 310, email server 320, workflow server 330, and ingestion database 340 and associated processors 311, 321, and 331, memories 312, 322, and 332, input/output 313, 323, and 333, and communications interface 314, 324, and 334. Ingestion database 340 is configured to provide the email content table, lookup table, work item table, file processing table, and other tables as needed to perform the functions described herein.

Figure 4:
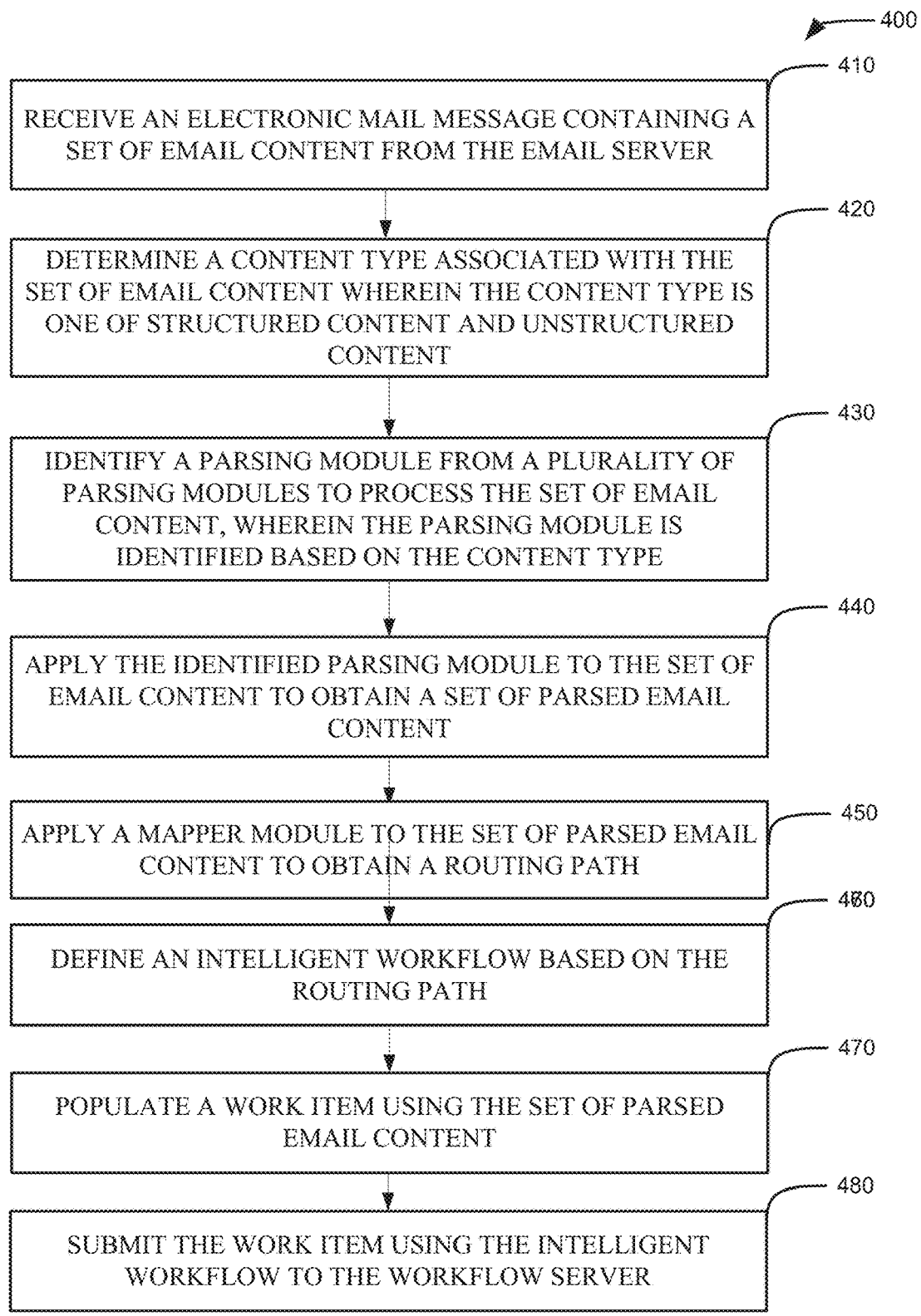
FIG. 4 is a flow diagram representing the email processing and intelligent workflow provision method from the perspective of the ingestion server shown in FIG. 3.

FIG. 4 is a flow diagram 400 representing the ingestion and workflow provision process from the perspective of the ingestion system 300 (shown in FIG. 3). The ingestion server 310 (shown in FIG. 3) is configured to receive 410 an electronic mail message containing a set of email content from the email server. The ingestion server 310 is also configured to determine 420 a content type associated with the set of email content wherein the content type is one of structured content and unstructured content. The ingestion server 310 is also configured to identify 430 a parsing module from a plurality of parsing modules to process the set of email content, wherein the parsing module is identified based on the content type. The ingestion server 310 is also configured to apply 440 the identified parsing module to the set of email content to obtain a set of parsed email content. The ingestion server 310 is also configured to apply 450 a mapper module to the set of parsed email content to obtain a routing path. The ingestion server 310 is also configured to define 460 an intelligent workflow based on the routing path. The ingestion server 310 is also configured to populate 470 a work item using the set of parsed email content and to submit 480 the work item using the intelligent workflow to the workflow server.

Figure 5:
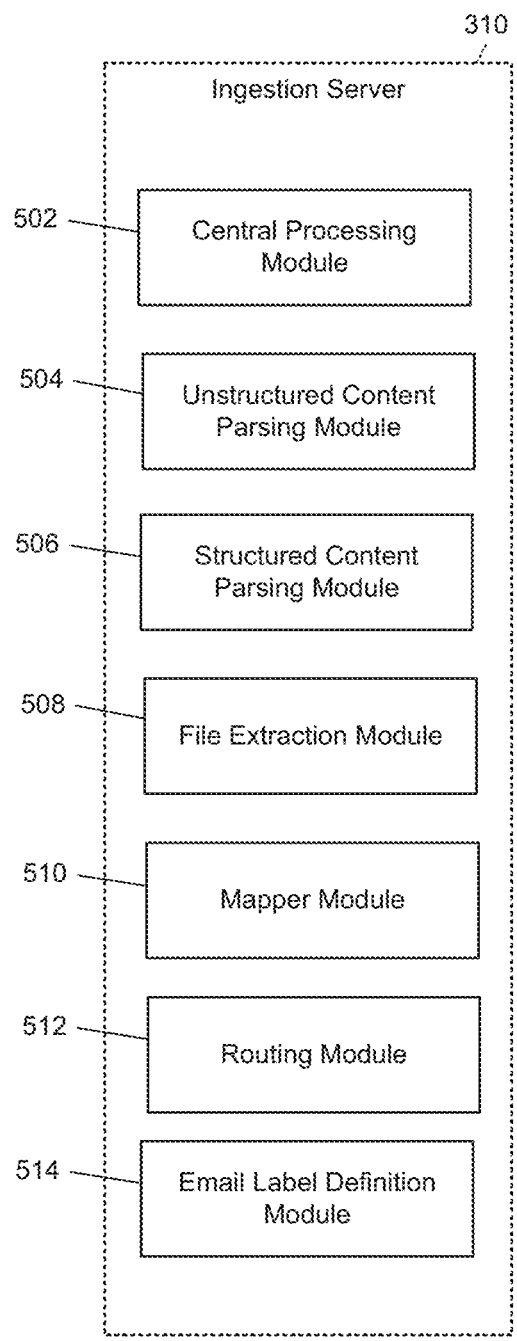
FIG. 5 is a diagram of elements of one or more example computing devices that may be used in the system shown in FIGS. 1 and 3.

FIG. 5 is a diagram 500 of elements of one or more example computing devices that may be used in the system shown in FIGS. 1 and 3. Specifically, FIG. 5 describes subsystems available to ingestion server 310 including central processing module 502, unstructured content parsing module 504, structured content parsing module 506, file extraction module 508, mapper module 510, routing module 512, and email label definition module 514, all of which are described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An ingestion server for processing emails and providing one or more intelligent workflows, the ingestion server comprising a processor and a memory, said processor being configured to:
   receive an electronic mail message containing a set of email content, wherein a content type is not identified within the set of email content;
   determine the content type associated with the set of email content based on one or more of a from address of the set of email content, or a subject of the set of email content, wherein the content type is structured content or the content type is unstructured content;
   identify a parsing module from a plurality of parsing modules to process the set of email content, wherein the parsing module is identified based on the content type;
   apply the identified parsing module to the set of email content to obtain a set of parsed email content;
   apply a mapper module to the set of parsed email content to obtain a routing path;
   define an intelligent workflow based on the routing path;
   populate a work item using the set of parsed email content; and
   submit the work item using the intelligent workflow.

2. The ingestion server of claim 1, wherein the processor is further configured to:
   apply a file extraction module to the set of email content to obtain a file attached to the set of email content;
   apply the identified parsing module to the attached file to obtain a set of parsed attached data; and
   populate the work item using the set of parsed email content and the set of parsed attached data.

3. The ingestion server of claim 1, wherein the processor is further configured to:
   generate a work item identifier associated with the electronic mail message upon receiving the electronic mail message;
   define the work item with the work item identifier; and
   populate the work item using the set of parsed email content.

4. The ingestion server of claim 1, wherein the processor is further configured to:

upon determining the content type associated with the set of email content is the structured content, identify a set of fixed structures associated with the structured content;
identify the parsing module based on the parsing module being configured to obtain data associated with the set of fixed structures; and
apply the identified parsing module to the set of email content to obtain the set of parsed email content which is associated with the set of fixed structures.

5. The ingestion server of claim 1, wherein the content type associated with the set of email content is the unstructured content, and the processor is further configured to:
receive an email content table including a plurality of entries having associated subjects and associated from addresses;
attempt to match at least one of the subject of the set of email content or the from address of the set of email content to one or more of the plurality of entries having a matching associated subject of the associated subjects matching the subject of the set of email content or a matching associated from address from the associated from addresses matching the from address of the set of email content; and
apply the mapper module to the set of parsed email content to obtain the routing path, wherein the routing path is at least partially identified by the attempt to match the matching associated subject matching the subject of the set of email content or the matching associated from address matching the from address of the set of email content.

6. The ingestion server of claim 5, wherein the processor is further configured to:
upon failing the attempt to match at least one of the subject of the set of email content and the from address of the set of email content to the plurality of entries, determine that the set of email content is associated with a business exception;
identify a business exception path; and
apply the mapper module to the set of parsed email content to obtain the routing path associated with the business exception path.

7. The ingestion server of claim 5, wherein the processor is further configured to:
receive an update to the email content table associated with an update subject and an update from address;
validate that the update subject and update from address do not exist in the email content table; and
update the email content table with the update.

8. At least one non-transitory computer readable storage medium, comprising a set of instructions, which when executed by a computing device, cause the computing device to:
receive an electronic mail message containing a set of email content, wherein a content type is not identified within the set of email content;
determine the content type associated with the set of email content based on one or more of a from address of the set of email content, or a subject of the set of email content, wherein the content type is structured content or the content type is unstructured content;
identify a parsing module from a plurality of parsing modules to process the set of email content, wherein the parsing module is identified based on the content type;
apply the identified parsing module to the set of email content to obtain a set of parsed email content;
apply a mapper module to the set of parsed email content to obtain a routing path;
define an intelligent workflow based on the routing path;
populate a work item using the set of parsed email content; and
submit the work item using the intelligent workflow.

9. The at least one non-transitory computer readable storage medium of claim 8, comprising a further set of instructions, which when executed by the computing device, cause the computing device to:
apply a file extraction module to the set of email content to obtain a file attached to the set of email content;
apply the identified parsing module to the attached file to obtain a set of parsed attached data; and
populate the work item using the set of parsed email content and the set of parsed attached data.

10. The at least one non-transitory computer readable storage medium of claim 8, comprising a further set of instructions, which when executed by the computing device, cause the computing device to:
generate a work item identifier associated with the electronic mail message upon receiving the electronic mail message;
define the work item with the work item identifier; and
populate the work item using the set of parsed email content.

11. The at least one non-transitory computer readable storage medium of claim 8, comprising a further set of instructions, which when executed by the computing device, cause the computing device to:
upon determining the content type associated with the set of email content is the structured content, identify a set of fixed structures associated with the structured content;
identify the parsing module based on the parsing module being configured to obtain data associated with the set of fixed structures; and
apply the identified parsing module to the set of email content to obtain the set of parsed email content which is associated with the set of fixed structures.

12. The at least one non-transitory computer readable storage medium of claim 8, wherein the content type associated with the set of email content is the unstructured content, and the at least one non-transitory computer readable storage medium comprises a further set of instructions, which when executed by the computing device, cause the computing device to:
receive an email content table including a plurality of entries having associated subjects and associated from addresses;
attempt to match at least one of the subject of the set of email content or the from address of the set of email content to one or more of the plurality of entries having a matching associated subject of the associated subjects matching the subject of the set of email content or a matching associated from address from the associated from addresses matching the from address of the set of email content; and
apply the mapper module to the set of parsed email content to obtain the routing path, wherein the routing path is at least partially identified by the attempt to match the matching associated subject matching the subject of the set of email content or the matching associated from address matching the from address of the set of email content.

13. The at least one non-transitory computer readable storage medium of claim 12, comprising a further set of instructions, which when executed by the computing device, cause the computing device to:

upon failing the attempt to match at least one of the subject of the set of email content and the from address of the set of email contents to the plurality of entries, determine that the set of email content is associated with a business exception;

identify a business exception path; and apply the mapper module to the set of parsed email content to obtain the routing path associated with the business exception path.

14. The at least one non-transitory computer readable storage medium of claim 12, comprising a further set of instructions, which when executed by the computing device, cause the computing device to:

receive an update to the email content table associated with an update subject and an update from address;

validate that the update subject and update from address do not exist in the email content table; and update the email content table with the update.

15. A method for processing emails and providing one or more intelligent workflows performed by an ingestion server, the ingestion server including a processor and a memory, said method comprising:

receiving an electronic mail message containing a set of email content, wherein a content type is not identified within the set of email content;

determining the content type associated with the set of email content based on one or more of a from address of the set of email content, or a subject of the set of email content, wherein the content type is structured content or the content type is unstructured content;

identifying a parsing module from a plurality of parsing modules to process the set of email content, wherein the parsing module is identified based on the content type;

applying the identified parsing module to the set of email content to obtain a set of parsed email content;

applying a mapper module to the set of parsed email content to obtain a routing path;

defining an intelligent workflow based on the routing path;

populating a work item using the set of parsed email content; and submitting the work item using the intelligent workflow.

16. The method of claim 15, further comprising:

applying a file extraction module to the set of email content to obtain a file attached to the set of email content;

applying the identified parsing module to the attached file to obtain a set of parsed attached data; and populating the work item using the set of parsed email content and the set of parsed attached data.

17. The method of claim 15, further comprising:

generating a work item identifier associated with the electronic mail message upon receiving the electronic mail message;

defining the work item with the work item identifier; and populating the work item using the set of parsed email content.

18. The method of claim 15, further comprising:

upon determining the content type associated with the set of email content is the structured content, identifying a set of fixed structures associated with the structured content;

identifying the parsing module based on the parsing module being configured to obtain data associated with the set of fixed structures; and applying the identified parsing module to the set of email content to obtain the set of parsed email content which is associated with the set of fixed structures.

19. The method of claim 15, wherein the content type associated with the set of email content is the unstructured content, and the method further comprises:

receiving an email content table including a plurality of entries having associated subjects and associated from addresses;

attempting to match at least one of the subject of the set of email content or the from address of the set of email content to one or more of the plurality of entries having a matching associated subject of the associated subjects matching the subject of the set of email content or a matching associated from address from the associated from addresses matching the from address of the set of email content; and applying the mapper module to the set of parsed email content to obtain the routing path, wherein the routing path is at least partially identified by the attempt to match the matching associated subject matching the subject of the set of email content or the matching associated from address matching the from address of the set of email content.

20. The method of claim 19, further comprising:

upon failing the attempt to match at least one of the subject of the set of email content and the from address of the set of email content to the plurality of entries, determining that the set of email content is associated with a business exception;

identifying a business exception path; and applying the mapper module to the set of parsed email content to obtain the routing path associated with the business exception path.

* * * * *